Feb. 17, 1970 M. L. SNEDEKER ET AL 3,496,443

CONTROL CIRCUIT FOR ELECTRICAL GENERATING SYSTEM

Filed Feb. 23, 1967

INVENTORS
MARION L. SNEDEKER
JOHN W. KORDA
BY Yount, Perry, Flynn, and Tarolli
ATTORNEYS 3,496,443
Patented Feb. 17, 1970

3,496,443
CONTROL CIRCUIT FOR ELECTRICAL GENERATING SYSTEM

Marion L. Snedeker and John W. Korda, East Cleveland, Ohio, assignors to The Leece-Neville Company, Cleveland, Ohio, a corporation of Ohio Filed Feb. 23, 1967, Ser. No. 618,032
Int. Cl. H02j 7/16
U.S. Cl. 320—39 7 Claims

ABSTRACT OF THE DISCLOSURE

An electrical system including a battery and an alternator-rectifier unit connected across load conductors to supply current thereto. The field circuit for the alternator-rectifier unit is connected across the load conductors and includes a regulator and a static switch for effectively opening and closing the circuit to the regulator and field. The static switch is turned on and off by a semiconductor control device which is responsive to the voltage of the alternator. A bleed circuit, including an indicator lamp and switch, is connected between the battery and the regulator to supply bleed current to the field during starting while the static switch is effectively open.

Figure 1:
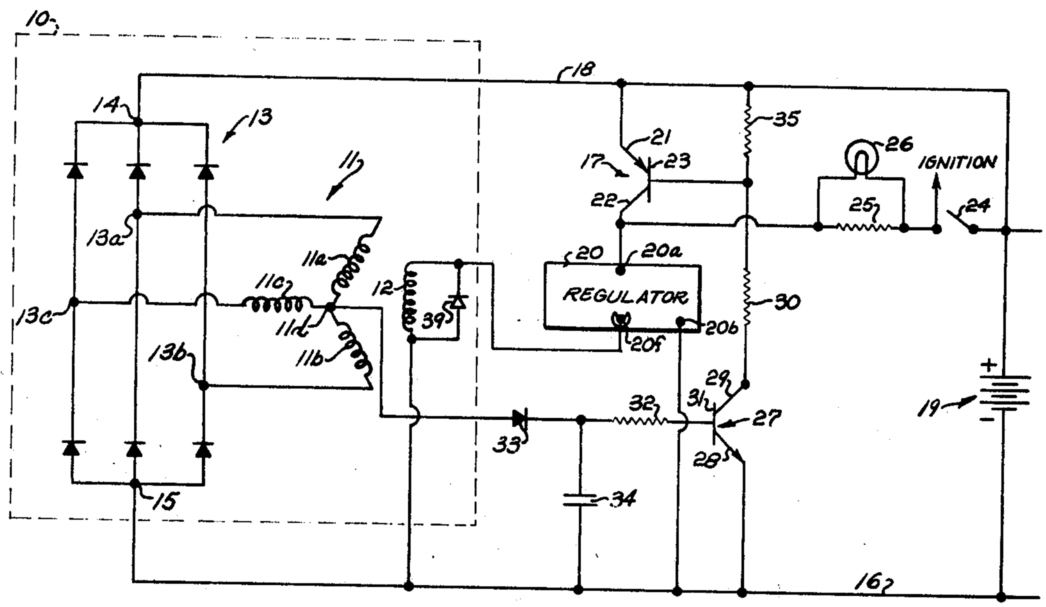

This invention relates to an electrical generating system having a voltage generating machine, such as an alternator-rectifier unit on an automotive vehicle, for connection to a load which includes a battery.

An important object of the present invention is to provide a new and improved electrical generating system for use in automotive vehicles in which a static circuit element is utilized to prevent current drain from the battery through the field circuit when the system is not operating, with the circuit being arranged in such a manner that the static switch is not required to carry or break load currents.

Another object of the present invention is the provision of a new and improved electrical generating system, particularly such a system for automotive vehicles, in which switching means connects and disconnects the field circuit from the system in response to the voltage output of a generating machine, the system being a static switching system and eliminating the problems commonly associated when field relays are used for this purpose.

Another object of the present invention is to provide a new and improved electrical generating system for a load circuit including a battery, the generating system including switching means for controlling the connection of the field circuit of a generating machine to the load circuit to disconnect the field circuit of the generating machine from the load circuit to prevent battery drain when the generating machine is not operating, the system being such that the switching means is capable of passing current to the field circuit when the output of the generating machine is at a low value.

A further object of the present invention is to provide a new and improved electrical generating system in which the field circuit of a generating machine, including a regulator, is effectively connected and disconnected from the load conductor when the generating system is started or stopped by switching means which does not include contacts or relay coils which must be operated to establish the connection of the field winding and regulator to the load circuit.

Another object of the present invention is to provide a new and improved electrical generating system for a load circuit including a battery, the generating system including switching means for controlling the connection of the field circuit of a generating machine to the load circuit to disconnect the field circuit from the load circuit to prevent battery drain when the generating machine is not operating, the system being such that chattering problems commonly associated with field relays are not present.

Another object of the present invention is to provide a new and improved electrical generating system for a load circuit including a battery, the generating system including switching means for controlling the connection of the field circuit of a generating machine to the load circuit to disconnect the field circuit from the load circuit to prevent battery drain when the generating machine is not operating, the system being such that the switching means does not abruptly break the field circuit when the generating machine is stopped, as in the stopping of its driving engine.

Another object of this invention is to provide a novel and improved regulating and field relay switch arrangement in an electrical generating system which is adapted to be composed entirely of solid state devices and passive circuit elements, all of which are free of moving parts, and preferably such that all can be within one casing.

Another object of this invention is to provide a novel and improved control circuit in an electrical generating system which is adapted to be embodied in an integrated circuit.

Figure 2:
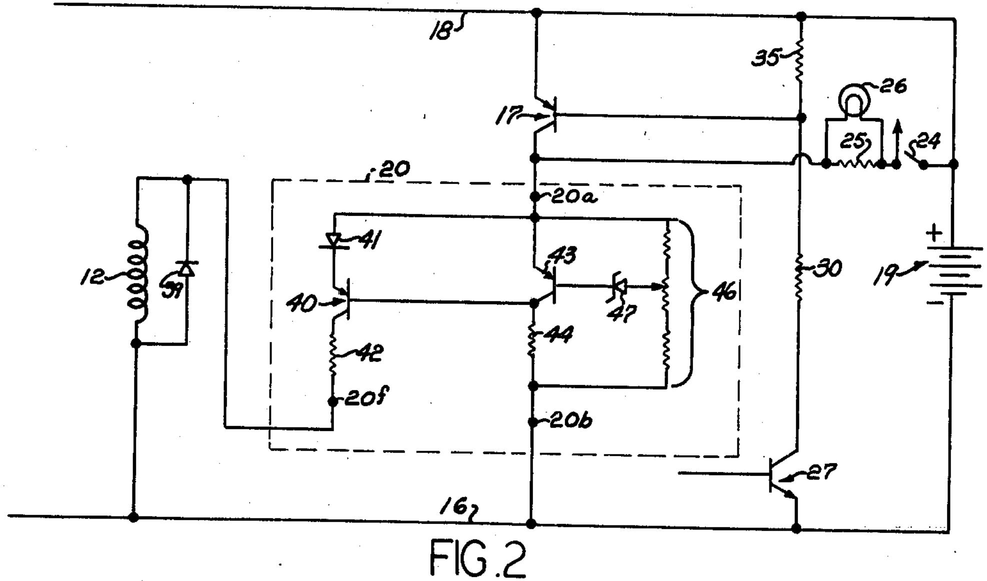

Further objects and advantages of the present invention will be apparent from the following detailed description of a presently-preferred embodiment, which is illustrated schematically in the accompanying drawing in which:

FIGURE 1 is a schematic circuit diagram showing an electrical generating system in accordance with the present invention; and FIGURE 2 is a partial circuit diagram showing one form of regulator connected in the present system.

Referring to FIG. 1, the electrical generating system of the present invention includes an alternator-rectifier unit 10 of known design. The alternator in this unit has a three-phase winding 11 on the stator and a field winding 12 on the rotor. The different phase windings of the armature are designated by the reference numerals **11*a*, 11*b* and 11*c*, respectively. These phase windings are connected to the respective input terminals 13*a*, 13*b* and 13*c* of a full-wave rectifier 13 having positive and negative output terminals 14 and 15. The negative output terminal 15 is connected to a negative load conductor 16, which may be grounded. The positive output terminal 14 is connected to a positive load conductor 18. The load which is to be energized by the alternator includes a storage battery 19 connected across the load conductors 18 and 16. The alternator-rectifier unit 10 and the battery 19** may be on a vehicle, such as an automobile, with the alternator being driven by the vehicle engine.

In accordance with known practice, a regulator circuit 20 is connected to the field winding 12 to control the latter's energization. The regulator 20, to be described in greater detail with reference to FIG. 2, may be of known design. It has positive and negative terminals **20*a* and 20*b*, respectively, and a field terminal 20*f*. Preferably, the regulator is composed entirely of solid state active circuit elements, such as transistors and rectifiers, and passive circuit elements, such as resistors, and is capable of passing current to the field coil when the alternator is not operating. The regulator 20 may sense either the output voltage or the output current, or both, of the alternator-rectifier unit 10, and it controls the energization of the field winding 12 so as to regulate the electrical output (voltage, current, or both) of the alternator-rectifier unit 10**.

A field discharge rectifier 39 is connected across the field winding.

In accordance with the present invention, a static semiconductor switch device 17 is connected between the positive regulator terminal 20*a* and the positive load conductor 18, and the field winding 12 of the alternator is connected between the field terminal 20*f* of regulator 20 and the negative load conductor 16. The negative terminal 20*b* of the regulator is also connected to the negative load conductor 16.

In the embodiment shown, the semiconductor switch device 17 is a transistor having an emitter electrode 21 connected directly to the positive load conductor 18, a collector electrode 22 connected to the positive terminal 20*a* of the regulator 20, and a base electrode 23. With this arrangement, when the transistor 17 is cut off or substantially cut off, there is not appreciable current conduction between its emitter and collector electrode and it constitutes substantially an open-circuit between the regulator 20 and the positive load conductor 18. Conversely, when the transistor 17 is conductive, particularly when fully conductive, there is appreciable current flow through the emitter-collector path of transistor 17 and it provides a very low impedance connection between the positive load conductor 18 and the regulator 20, so that the regulator can control the energization of the field winding 12 in a known manner.

A switch 24, which may be the ignition switch for the engine of the vehicle, is connected between the positive side of the battery 19 and the positive terminal 20*a* of the regulator 20 through a resistor 25. An indicator lamp 26 is connected in parallel with resistor 25. On starting, the switch 24 is closed and a voltage and bleed current will be supplied through the resistor 25 and lamp 26 to the regulator 20 so that a field current will flow in the field winding 12 to cause the alternator to come up to voltage more quickly. The indicator lamp 26 will be lighted when switch 24 is closed until the voltage of the positive terminal 20*a* of the regulator 20 approaches that of the positive load conductor 18. This will occur as the transistor 17 becomes conductive.

The switching transistor 17 is controlled by a control device in the form of a control transistor 27, which has an emitter electrode 28 connected directly to the negative load conductor 16, a collector electrode 29 connected through a resistor 30 to the base 23 of the switching transistor 17 which is, in turn, connected to the load conductor 18 by a resistor 35, and a base electrode 31 connected to be energized from the alternator. In the particular embodiment illustrated, the base electrode 31 of the control transistor 27 is connected through a resistor 32 and a semiconductor rectifier 33 to the common point 11*d* of the Y-connected stator windings 11*a*, 11*b* and 11*c* in the alternator. Alternatively, this connection may be made to the outer end of any one of the Y-connected stator windings 11*a*, 11*b* or 11*c*, or to any end of a delta-connected stator if the alternator has such a stator, or to any other voltage source which is to control the conduction of transistor 17. Such other source might be a separate D.C. source or derived from the battery.

A capacitor 34 is connected between the negative load conductor 16 and the end of resistor 32 away from the base electrode 31 of the control transistor 27.

In describing the operation of this control arrangement it will be first assumed that initially the ignition switch 24 is open, the vehicle engine is not running, and the alternator 11, 12 is not running. At this time, both transistors 17 and 27 will be non-conducting and the high impedance thereof will prevent current flow through the transistors in either the field circuit or the voltage dividing network comprising the resistors 35, 30. Thus, there is no drain on the battery even though the circuits are connected thereacross.

When the ignition switch 24 is first closed, the battery 19 will be connected through resistor 25 and lamp 26 across the series-connected regulator 20 and field winding 12. Consequently, the field winding 12 is energized by a relatively small bleed current from the battery 19 to aid the alternator to come up to the desired voltage. Because of the voltage drop across the lamp 26 and the resistor 25, the voltage across the series-connected regulator 20 and field winding 12 is appreciably less than the battery voltage. This voltage drop energizes the indicator lamp 26 and causes it to be lit.

At first, the control transistor 27 and the switching transistor 17 are non-conductive, thereby maintaining the regulator 20 disconnected from the alternator-rectifier unit 10. As the alternator starts to generate, a direct current input voltage is applied in a forward direction to the base 31 of the control transistor 27 and this will cause transistor 27 to start to conduct. This causes a collector-emitter current through transistor 27 which produces a voltage drop across resistor 35 which lowers the potential on the base 23 of the switching transistor 17 enough to cause the transistor 17 to conduct. At first, the voltage applied to the base will be in the form of rectified "blips" and while small in amplitude, the input will cause some conduction of the transistors 27 and 17 to supply additional "boot-strapping" current and voltage to the regulator 20 and field winding 12 through the transistor 17. As the voltage builds up, the transistors become increasingly conductive until the transistor 17 is operating in a fully conductive condition and functions as a closed switch to supply field current as dictated by the regulator 20.

It will be understood by those in the art from the foregoing description that small alternator voltages will cause the switching transistor 17 to begin to conduct and that it may be made to become fully conductive at low voltages, which are well below the normal operating range of regulation, by properly selecting the values of resistors 30 and 35. As the transistor 17 becomes conductive, the voltage drop across the lamp 26 will decrease and lamp 26 will be extinguished.

It will be further understood that on the stopping of the alternator, the drop in alternator output will cause the switching transistor 17 to become progressively less conductive rather than abruptly switching off the current and that there will not be chattering problems as is true with conventional field relays.

If the alternator fails during operation, the described circuit will cut off the field current and will light the indicator lamp 26. When there is a failure of the alternator, the control transistor 27 will become non-conducting and, in turn, will cause the switching transistor 17 to become non-conducting so as to disconnect the alternator-rectifier unit from both the load and the regulator.

It will be evident from the foregoing description that the present control circuit has no moving parts since it is composed entirely of active semiconductor elements, such as transistors and rectifiers, and passive circuit elements, such as resistors and capacitors. The regulator 20 and the other elements of the control circuit may be housed in a single casing, or, if desired, they could all be embodied in an integrated circuit.

Another advantage of the present control circuit is that it enables a simple, yet effective, connection of the indicator lamp in the system such that it will be lit whenever the alternator fails or when the switching transistor 17 has a substantial voltage drop thereacross indicating low output voltage from the alternator-rectifier unit.

In FIG. 1, the regulator 20 is shown as being connected and disconnected from the load conductor 18 by the switching transistor 17. The schematic showing in FIG. 1 indicates that the entire regulating circuit is connected and disconnected from the load conductor 18. However, it will be appreciated by those skilled in the art that those parts of the regulating circuit which do not draw current in a non-operating condition need not be disconnected from the load conductor 18.

The circuit of FIG. 2 illustrates one suitable embodiment of the regulator 20. As shown therein, the positive terminal 20*a* of the regulator is connected to energize the field winding 12 through a series-connected diode 41, field transistor 40, and a current-limiting resistor 42. The diode 41 is connected between the positive terminal 20*a* and the emitter of the transistor 40. Resistor 42 is connected between the collector of transistor 40 and the field winding 12.

The conduction of the field transistor 40 is controlled by a driver transistor 43 having its emitter connected to the positive terminal 20*a* of the regulator and its collector connected to the negative terminal 20*b* by a resistor 44. The collector of transistor 43 is also connected to the base of the field transistor 40 and the circuit arrangement is such that when the transistor 43 is non-conductive, transistor 40 is substantially fully conductive, and when transistor 43 becomes conductive, transistor 40 becomes non-conductive.

The field discharge rectifier 39 may be omitted if the emitter-collector voltage of transistor 40 is high enough, such as 100 volts or more.

The base of transistor 43 is connected to a voltage dividing network 46 connected between the positive terminal 20*a* of the regulator and the negative terminal 20*b*. The base of transistor 43 is connected to an intermediate point on the voltage-dividing network by a Zener diode 47 which breaks down when the maximum voltage of the regulation range is reached. This renders the transistor 43 conductive to turn off the transistor 40 and block the field current in the field winding 12. When the Zener diode extinguishes at the lower range of voltage regulation, the transistor 43 becomes non-conductive, its collector voltage becomes more negative and an input current flows to the transistor 40 to cause conduction to the field winding 12 to again supply field current to the alternator.

It will be clear from the circuit of FIG. 2 that the emitter of the transistor 43 could be connected directly to the load conductor 18, rather than through the switching transistor 17, since the battery voltage is not normally high enough to break down the Zener diode 47 in the illustrated circuit. Consequently, no current drain would occur through either the transistor 43 or the Zener diode 47. For simplicity of construction and arrangement, it is preferable, however, that the emitter of transistor 43 be connected to the regulator terminal 20*a* rather than directly to the load conductor 18. Moreover, this removes any possibility of a current drain by reason of a faulty transistor 43 or a faulty Zener diode 47.

While a presently-preferred embodiment of the present invention has been described in detail and illustrated schematically in the accompanying drawing, it is to be understood that this invention is susceptible of other embodiments and that various modifications, omissions and refinements may be adopted without departing from the scope of the present invention, as defined in the appended claims. For example, if desired, the base electrode of the control transistor 27 could be connected to the ignition switch to be turned on by battery current when the ignition switch is closed, or it could be turned on by any other voltage source external to the alternator. Also, while the circuit arrangement shown in the drawing, with transistors 17, 40 and 43 being of the PNP type and transistor 27 being NPN, is best adapted for a system having the negative load conductor 16 grounded, the present invention may also be embodied in a circuit in which transistors 17, 40 and 43 are NPN and transistor 27 is PNP, which would be best adapted for a system in which the positive load conductor 18 is grounded. If the system is ungrounded, either combination of transistor types could be used, depending upon the polarity of the ignition switch.

Having described our invention, we claim:

1. In an electrical generating system, a generating machine for supplying load current to positive and negative load conductors, a battery, means connecting said battery across said conductors, said machine having a field winding energizable to control the output of said machine, a regulator responsive to the output of said machine and controlling the flow of current in said field winding, said regulator having first circuit means in a conductive state to be connected across said load conductors and in circuit with said battery and adapted to conduct current on starting, a static switch connected in series with said first circuit means and having conductive and non-conductive conditions for connecting and disconnecting said first circuit means to and from said load conductors, said first circuit means being operable in its condition when said machine is stopped to conduct current from said battery when connected to said battery, said switch having a control element, and second circuit means connected to said control element and across said load conductors to render said switch conductive on the starting of said machine and non-conductive on the stopping of said machine, said second circuit means comprising a second switch device rendered conductive and non-coductive respectively on the starting and stopping of said machine.

2. An electric generating system according to claim 1, wherein said static switch is a semiconductor device having output electrodes in series with said first circuit means across said load conductor, and said control element is a control electrode of said semiconductor device for controlling current between said output electrodes.

3. An electric generating system as defined in claim 2, wherein said second switch device is a semiconductor switch having a control element, and said system further includes additional circuit means connected to said last-mentioned control element for rendering said second switch device conductive and non-conductive.

4. In an electrical generating system having an electrical generating machine with a uni-directional output for connecting to a load which includes a battery, load conductors connecting said machine and load, and a regulator for regulating the electrical output of said machine, the improvement which comprises: a semi-conductor switch connecting said regulator to one of said conductors, a resistor connected in series with said switch between the output of the machine and the load in parallel with said one load conductor, an indicator lamp connected across said resistor to be lighted when said switch is non-conductive, and means responsive to said machine output only to render said switch conductive, said energizing machine having an electrically energizable field winding, and said semi-conductor switch, said regulator and said field winding being connected in series across said load conductors.

5. A generating system according to claim 4, and further comprising switch means connected to said resistor in series with the load across the series-connected regulator and field winding.

6. An electrical generating system, an alternator, a load to be energized with direct current, a rectifier having input terminals connected to said alternator and output terminals connectd to said load to energize said load from said alternator, said load including a battery connected across said output terminals, a field circuit for said alternator comprising an alternator field winding and a regulator connected in series, first circuit means connecting said field circuit across said battery and across said output terminals comprising a first static switch connected in series between said field circuit and one of said output terminals, said static switch having a control element to which a signal is to be applied to render said switch conductive to conduct current to said field winding and regulator, said regulator normally being in condition to conduct current and being actuated to a non-conductive condition in response to a desired maximum voltage at said output terminal, second circuit means connected across said output terminals and said battery for applying a signal to said control element to render said static switch effective to conduct current to said regulator, said second circuit means comprising a second static switch operable between conductive and non-conductive conditions to render said second circuit means effective and non-effective to conduct current, said signal being applied to said control element in response to current flow in said second circuit means, said second static switch having a control electrode, and additional circuit means interconnecting said control electrode and said alternator on the input side of said rectifier to be responsive to alternator voltage and render said second switch means conductive as said alternator comes up to voltage.

7. A system as defined in claim 6 wherein a starting circuit comprising a switch and a parallel circuit is connected in series from the battery to said field circuit to supply current thereto independently of said first static switch, said parallel circuit comprising a resistance and a lamp connected in parallel.

References Cited

UNITED STATES PATENTS

| | | | |
|---|---|---|---|
| 3,151,288 | 9/1964 | Avizienis et al. | 322—28 |
| 3,202,901 | 8/1965 | Peras | 320—48 |
| 3,293,536 | 12/1966 | Byles | 322—28 |
| 3,343,059 | 9/1967 | Kirk et al. | 322—73 X |
| 3,373,333 | 3/1968 | Eckard | 320—32 |

LEE T. HIX, Primary Examiner

STANLEY WEINBERG, Assistant Examiner

U.S. Cl. X.R.

320—48, 68; 322—28, 73, 99